Aug. 26, 1969 J. A. REDDICK Re. 26,649
LINTER CLEANER
Original Filed Dec. 16, 1965
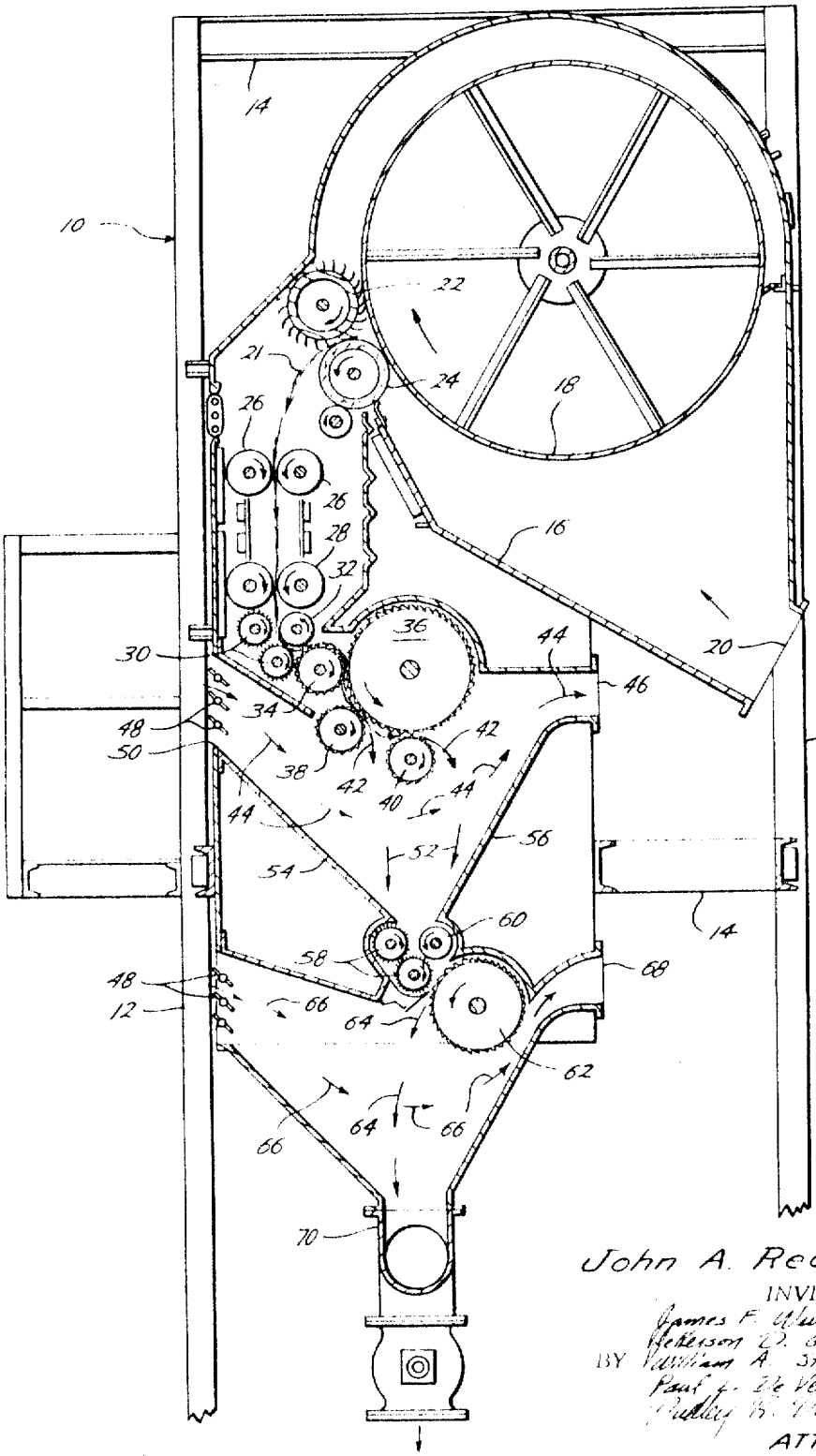
John A. Reddick
INVENTOR.
BY James F. Wiles
Peterson D. Fuller
William A. Stout
Paul F. De Vesley Jr.
Dudley B. Poole, Jr.
ATTORNEYS United States Patent Office Re. 26,649
Reissued Aug. 26, 1969

26,649
LINTER CLEANER

John A. Reddick, Houston, Tex., assignor to Anderson, Clayton & Co., Houston, Tex., a corporation of Delaware Original No. 3,355,776, dated Dec. 5, 1967, Ser. No. 514,210, Dec. 16, 1965. Application for reissue Feb. 29, 1968, Ser. No. 710,444
Int. Cl. D01b *1/02*
U.S. Cl. 19—202 2 Claims

Matter enclosed in heavy brackets [ ] appears in the original patent but forms no part of this reissue specification; matter printed in italics indicates the additions made by reissue.

*ABSTRACT OF THE DISCLOSURE*

The present invention relates to an improved method and device for cleaning cotton linters and more particularly to an improved method and device wherein cotton lint containing trash particles in finely dispersed and the lint fibers are pneumatically conveyed from the trash particles.

A major factor influencing the value of cotton lint is the content of trash and other foreign particles in the lint. Conventional devices for cleaning lint by removing such trash particles generally comprises a series of rollers fo rfeeding a thin bat of cotton lint to a high speed saw cylinder whereupon the fibers are centrifugally impacted against grid bars so that trash particles mixed with the fibers are thrown clear while the fibers remain upon the periphery of the saw cylinder and are removed therefrom by doffer means. Such a cleaning technique is inefficient in that low trash content lint is accompanied by high loss of lint fibers in the impacting operation. In addition, such technique is ineffective in cleaning short lint fibers. The present invention is directed to an improved method and device for efficiently cleaning lint cotton by pneumatically separating trash particles from finely dispersed lint fibers.

It is, therefore, an object of the present invention to provide an improved method and device for pneumatically separating trash particles from short lint fibers or cotton linters.

Another object of the present invention is to provide an improved method for cleaning lint cotton wherein the difference is specific gravities of the lint fiber and the trash particles effects separation of the fiber from trash particles.

A further object of the present invention is the provision of an improved device for cleaning short lint fibers by pneumatically conveying finely dispersed fibers from heavier trash particles.

Yet another object of the present invention is the provision of an improved method and device for cleaning lint cotton wherein lint fibers are formed into a thin bat and are progressively fed endwise to a series of saw cylinders whereupon the fibers become finely dispersed and upon contact with a low velocity air stream are conveyed away from trash particles contained therein.

Other and further objects, features and advantages will be apparent from the following description of a presently preferred embodiment of the invention, given for the purpose of disclosure, and taken inconjunction with the accompanying drawing, where,

[FIGURE 1] *The figure* is a sectional side view of a lint cotton cleaner embodying the improvement of the present invention, the section being taken in a vertical plane.

The improved method device of the present invention generally comprises the use of a series of rollers coacting to form cotton lint fibres into a thin bat and progressively feed such bat endwise to closely spaced rotary saw cylinders which create a fine dispersion of the bat. A low velocity air stream is then provided to convey the lint fibers away from the heavier trash particles which results in a highly efficient cleaning operation.

Referring now in detail to [FIGURE 1] *the figure of the drawing* the reference numeral 10 generally designates the apparatus of the present invention having vertical support beams 12 and horizontal support beams 14 which form a frame support. Mounted upon the frame formed by these beams is a fiber inlet cage 16. A suction condenser roller 18 is rotatably mounted on the frame and receives lint from inlet 20 on its exterior surface pulled by suction from vacuum means not shown.

The fiber bat 21 is drawn from the condenser 18 by a splined wheel 22 coacting with a smooth roller 24. Thereupon the bat is fed to the compression rollers 26 and 28 which serve to press the bat into a thin sheet. Then the splined surface transfer rollers 30 and the smooth compression roller 32 feed the thin bat to a first saw cylinder 34 and a second larger saw cylinder 36 rotating in the same peripheral direction as the first saw cylinder 34. Saw cylinders 34 and 36 are spaced so that there is only minimal operational clearance between them causing a clawing or separating action by the saw teeth on the bat 21 as it is fed to the rollers. Likewise, the additional saw cylinders 38 and 40 also rotating in the same peripheral direction as saw cylinder 36 but at a higher peripheral speed provide additional clawing action on the bat. This clawing action produces a fine dispersion of the bat, the dispersion being represented in the drawing by the arrows 42.

The air steam represented by the arrows 44 is passed across the dispersion 42 of fiber and trash particles to convey the lint fibers through the outlet 46. The air stream 44 is provided by suitable blower means not shown and may be properly regulated for velocity as for example by louvers 48 at the air inlet 50. The trash particles which have a greater specific gravity than the lint fibers fall gravitationally as indicated by the arrows 52.

The trash particles 52 fall into a rework chamber formed by the housing walls 54 and 56 for further recovery of lint fibers if necessary. The trash particles and remaining lint are picked up by splined rollers 58 coacting with a smooth roller 60 to feed the material to the saw cylinder 62. Again a dispersion is formed as indicated by the arrows 64 and a secondary air stream indicated by the arrows 66 is passed through such a dispersion. The air stream carries any further lint fibers to the outlet 68 and the trash particles fall to the receiver 70 for waste treatment. Again the air stream 66 is provided by blower means not shown and is regulated by louvers 48.

In operation, the first stage of saw cylinders 34, 36, 38 and 40 are rotated at a speed great enough to create the desired dispersion of the fibrous bat 21 which is progressively presented or fed to such saw cylinders. The first air stream 44 is preferably passed adjacent to and just below the saw cylinders in approximately a horizontal path although the angle of attack of the air stream is not critical. In practice, the velocity of the air stream should be no greater than 1000 feet per minute so that the lint fibers are efficiently conveyed away from the heavier trash particles.

The second rework stage of cylinders including cylinders 58 and 60 and saw cylinder 62 provide further dispersion of trash particles containing a small amount of lint not separated in the first stage. The second air stream 66 is operationally similar to the first air stream 44.

Thus provided are a method and a device for efficiently separating lint fibers from trash particles by pneumatic conveyance and gravitational effect. While the saw cylinders are shown and described as toothed cylinders, this does not rule out operability of other types of splined or lugged cylinders as equivalents in carrying out the present invention.

The present invention, therefore, is well adapted to carry out the objects and attain the ends and advantages mentioned as well as other inherent therein. While presently preferred embodiments of the invention have been given for the purpose of disclosure, numerous changes in the detail of construction and arrangement of parts may be made which will readily suggest themselves to those skilled in the art and which are encompassed within the spirit of the invention and the scope of the appended claims.

What is claimed is:

1. An improved method of cleaning lint cotton to remove trash particles contained therein comprising the steps of:

forming the lint cotton fibers into a thin bat, progressively presenting the bat endwise [between] *to* the nip formed by a plurality of saw cylinders in adjacent space relationship and rotating in the same peripheral direction whereby the fibers of the bat are finely dispersed.

passing a stream of air through the fiber dispersion whereby the lint fibers are pneumatically conveyed away from the trash particles, passing the trash particles gravitationally [between] *to* the nip formed by a further plurality of saw cylinders in spaced relation whereby the trash particles and remnants of lint fibers not initially conveyed therefrom are again finely dispersed, and passing a stream of air through the trash particle dispersion whereby the remnant lint fibers are pneumatically conveyed away from the trash particles.

[2. An improved method of cleaning lint cotton to remove trash particles contained therein comprising the steps of, forming the lint cotton fibers into a thin bat progressively presenting the bat endwise between the nip formed by a plurality of saw cylinders in adjacent spaced relationship, dispersing said fibers by rotating said saw cylinders in the same peripheral direction at their contiguous areas, passing a low velocity stream of air through the fiber dispersion, and pneumatically conveying the lint fibers away from the trash particles.]

[3. An improved device for pneumatically cleaning cotton lint fibers containing trash particles comprising, roller means for forming the lint fibers into a thin bat and transferring said bat to first saw cylinder means, second saw cylinder means for finely dispersing the thin bat of lint fibers, and means creating an air stream adjacent to and below the saw cylinder means in a substantially horizontal path for pneumatically conveying the lint fibers away from the trash particles in the dispersion.]

[4. The invention of claim 3 and further including, a second saw cylinder mans spaced below the first saw cylinder means for receiving the trash particles, and means creating a second air stream adjacent to and below said second saw cylinder means for conveying and further separating remnant lint fibers from the trash particles.]

*5. An improved device for pneumatically cleaning cotton lint fibers containing trash particles comprising,*

*roller means for forming the lint fibers into a thin bat,*

*first saw cylinder means for receiving and finely dispersing the thin bat of lint fibers,*

*means creating a first air stream adjacent to and below the first saw cylinder means in a substantially horizontal path for pneumatically conveying the lint fibers away from the trash particles in the dispersion,*

*second saw cylinder means spaced below the first saw cylinder means for receiving the trash particles, and*

*means creating a second air stream adjacent to and below said second saw cylinder means for conveying and further separating remnant lint fibers from the trash particles.*

References Cited

The following references, cited by the Examiner, are of record in the patented file of this patent or the original patent.

UNITED STATES PATENTS

| | | | |
|---|---|---|---|
| 1,886,044 | 11/1932 | Quinn et al. | |
| 1,960,497 | 5/1934 | Kidd. | |
| 2,062,626 | 12/1936 | Williams et al. | 19—89 XR |
| 2,071,438 | 2/1937 | Shorter et al. | 19—89 |
| 2,581,069 | 1/1952 | Bertolet. | |
| 2,810,163 | 10/1957 | Kyame et al. | |
| 2,876,500 | 3/1959 | Buresh et al. | |
| 3,046,612 | 7/1962 | Kyame et al. | |
| 3,144,686 | 8/1964 | Aoki. | |

FOREIGN PATENTS

| | | |
|---|---|---|
| 346,481 | 4/1931 | Great Britain. |
| 955,841 | 4/1964 | Great Britain. |

DORSEY NEWTON, Primary Examiner